March 27, 1928.  1,664,253

J. W. HUGHES

POWER TRANSMISSION MECHANISM

Filed Sept. 14, 1927   5 Sheets-Sheet 1

Inventor
JAMES W. HUGHES
By Leo Edelson
Attorney.

March 27, 1928. 1,664,253

J. W. HUGHES

POWER TRANSMISSION MECHANISM

Filed Sept. 14, 1927 5 Sheets-Sheet 2

Inventor:
JAMES W. HUGHES
By Leo Edelson
Attorney.

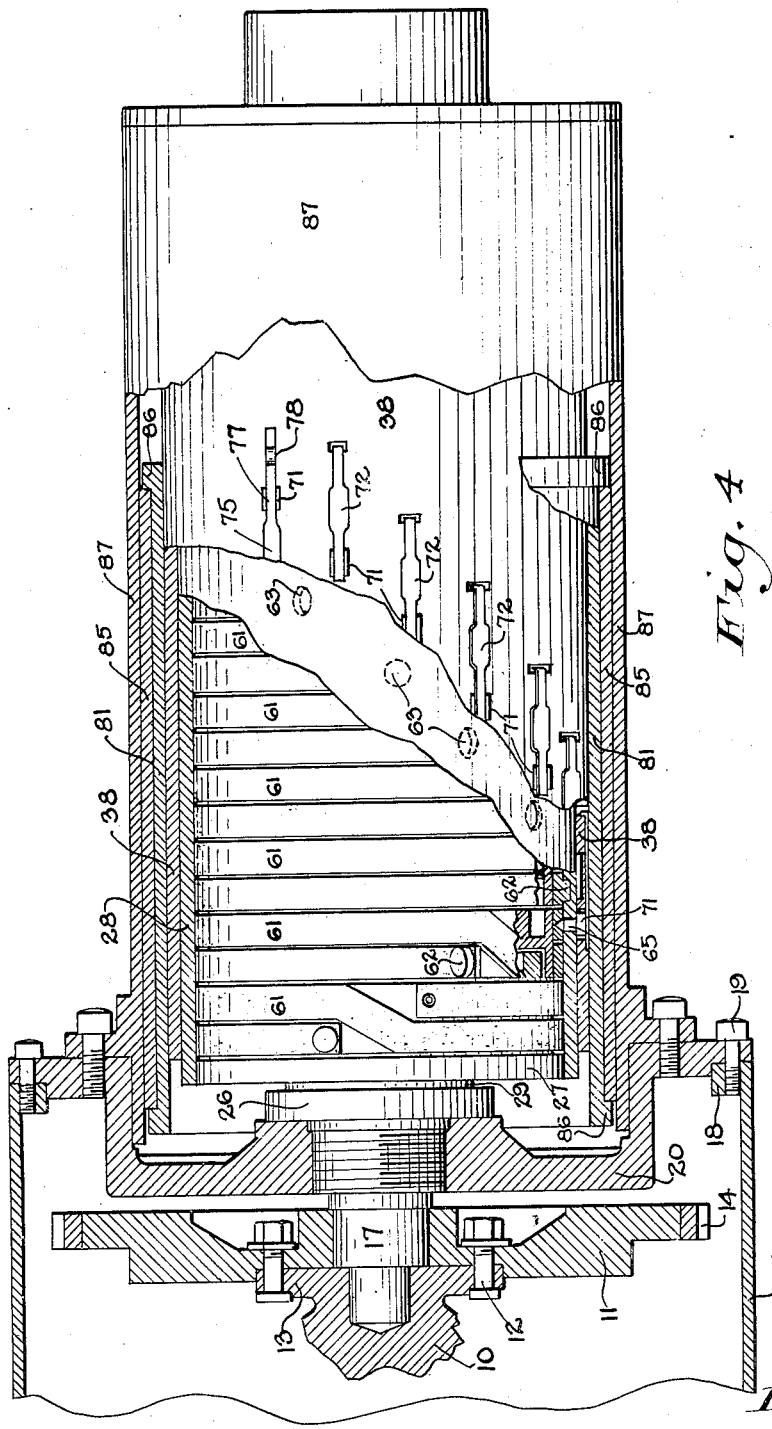

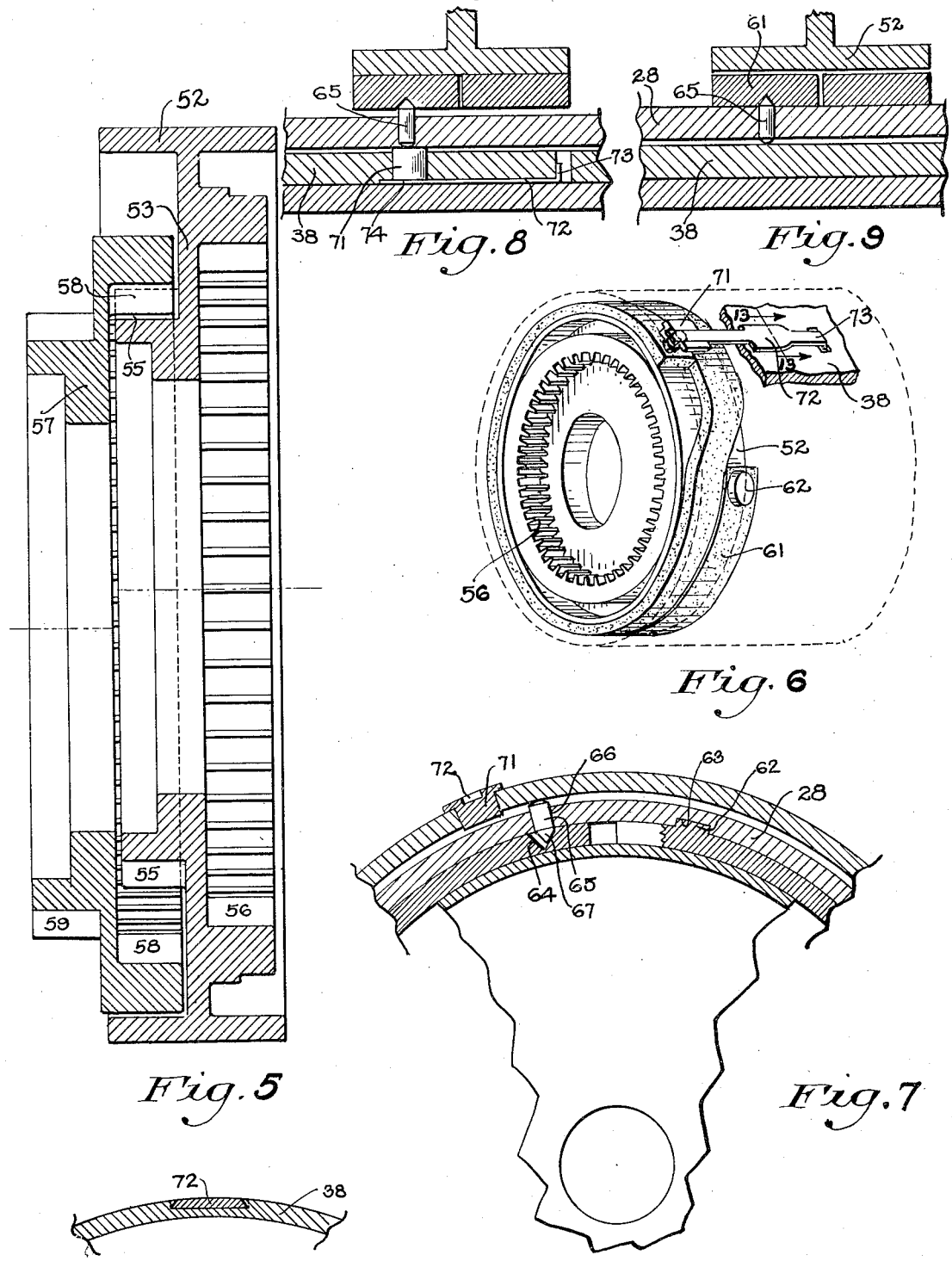

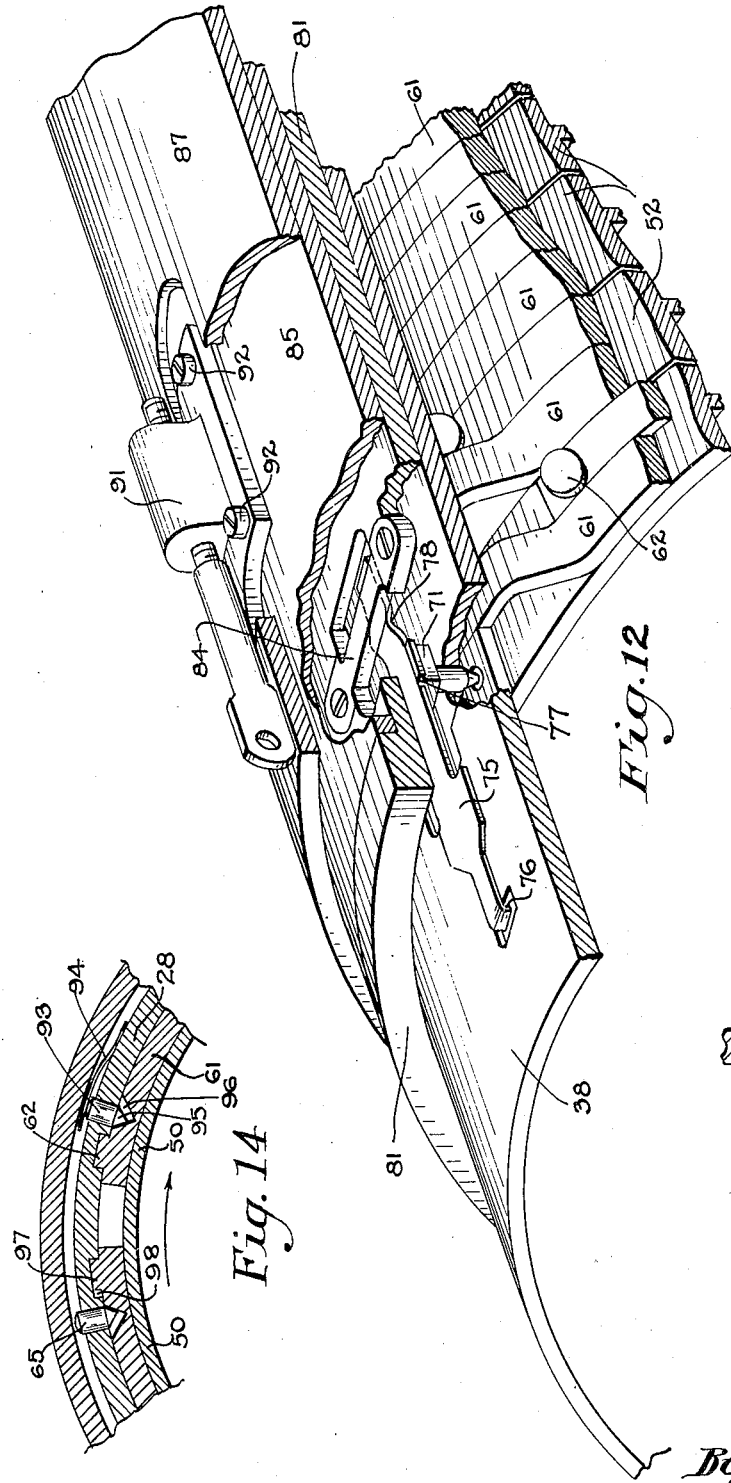

Patented Mar. 27, 1928.

1,664,253

UNITED STATES PATENT OFFICE.

JAMES W. HUGHES, OF PHILADELPHIA, PENNSYLVANIA, ASSIGNOR TO PROVIDENT TRUST COMPANY OF PHILADELPHIA, OF PHILADELPHIA, PENNSYLVANIA, A CORPORATION OF PENNSYLVANIA.

POWER-TRANSMISSION MECHANISM.

Application filed September 14, 1927. Serial No. 219,495.

This invention relates to power transmitting devices and more particularly to a transmission gearing, the gear ratio of which is automatically variable to provide that mechanical advantage between the driving and driven mechanisms which is necessary to overcome the torsional resistance which may have been encountered by said driven mechanism.

The invention is generally applicable as a power transmitting device for driving self-propelled vehicles, such as motor vehicles and the like, as well as for driving lathes, planers, shapers and any number of other such machine tools and apparatuses. For purposes of illustrating the principles of operation of the invention as hereinafter described, a preferred form of which is shown in the accompanying drawings, the present invention is described as being applied to motor vehicles. It will be understood, however, that the invention is broadly adapted for use wherever it is desired to transmit power from a prime mover adapted to develop limited torque to a driven shaft.

Internal combustion engines as applied to motor vehicles, this invention being especially concerned therewith, cannot be efficiently operated when overloaded inasmuch as the engine speed, and consequently the power delivered thereby, is immediately reduced upon such overloading. However, by varying the speed of the vehicle in such manner as to maintain the engine torque constant within certain limits the engine may be operated at maximum efficiency. Ordinarily, this result is accomplished by manually shifting the load from a high or intermediate speed gear to a lower speed gear of greater torque. On the other hand, if the power delivered by the engine is in excess of that which is required, the load is shifted from a low speed gear to a higher speed gear with the result that the vehicle is driven at increased speed, the driven mechanism encountering less torsional resistance. In each instance, however, the engine torque remains practically constant and as a result thereof the engine is operated at maximum efficiency.

Prior to this invention, various mechanisms have been devised for maintaining the torque in the engine shaft constant at the same time that the gearing ratio between the prime driving member and the final driven member is varied. Those skilled in the art to which this invention appertains have always been aware of the fact that the results obtained from these earlier mechanisms were not entirely satisfactory and desirable. In the present invention, the torque on the engine shaft is not maintained constant but can be varied from zero to a maximum torque of say 1,350 in. lbs. beyond which the torque of the engine shaft cannot go. In other words, as soon as the torque reaches a predetermined maximum, the gear ratio is automatically changed whereupon the engine shaft can again be put through any range of speeds of any degree of torque up to the next changing point. It thus becomes practically impossible to over-tax or stall the engine and yet the engine may be given any variable work to do that may be desired within the engine's capacity. From the foregoing it will appear that the idea of this invention is to provide a power transmission mechanism which is so designed as to limit the maximum torque in an engine shaft and then automatically change the gear ratio between the prime driving member and the final driven member when said maximum allowable torque in the engine shaft is reached.

Among the principal objects of this invention is the provision of a transmission mechanism wherein the gearing or driving ratio is automatically varied to compensate for variations in the torsional resistance encountered by the driven shaft of the motor vehicle, the engine torque or effort being controlled in such manner as never to exceed a predetermined maximum.

Another object of the invention is the provision of a transmission gearing wherein the torque of the final driven member can be varied either manually or automatically.

Still another object of the invention is the provision of a power transmission mechanism wherein the speed gear ratio between the prime driving member and the final driven member can be changed either manually or automatically as may be desired.

A further object of the invention is the provision of a power transmission mechanism adapted to automatically control the ratio of power in the driving shaft to the torsional resistance encountered in the driven shaft by the variation of said resistance, the operation of the mechanism being such that the necessity for the usual clutch and gear-shifting speed-change box is entirely eliminated.

A still further object of the invention is the provision of a power transmission mechanism wherein a series of gearing is maintained in fixed and permanent entrainment, the mechanism being provided with means for automatically selecting and so effecting operation of only those gears which are necessary to enable the engine to most efficiently overcome the torsional resistance encountered by the driven shaft.

A still further object of the invention is the provision of a series of entrained gears in a power transmitting mechanism, the gears being driven by a primary driving member and in turn being connected to a final driven member, the mechanism including means for changing the speed ratio between the driving and driven members without necessitating the disengagement of any of the gears. Due to this arrangement the speed of the vehicle may be reduced to a minimum without resort to the usual service or emergency brakes merely by manipulating the speed control so that the engine itself operates as a brake to reduce the speed of the vehicle.

A still further object of the invention is the provision of of a mechanism for automatically effecting immediate operative connection between as many of the series of constantly entrained gears as are necessary to provide a gear ratio between driving and driven shafts which is sufficient to overcome the torsional resistance encountered by the latter when the vehicle is started from rest, this ratio being automatically changed as the speed of the vehicle increases and the torsional resistance to be overcome is decreased.

A still further object of the invention is the provision of a transmission mechanism including a series of gears and a torque spring arranged intermediate the driving and driven members, the gears constituting the driving connection between said members and the gear ratio thereof being governed entirely by the degree of angular deflection of said torque spring.

A still further object of the invention is the provision of a series of internal-external gears arranged to be driven at different speeds, all of said gears being surrounded by a torque drum which is arranged to be clutched to one or another of said gears in such manner as to vary the speed ratio between the prime driving member and the final driven member without necessitating the disengagement of any of said gears.

A still further object of the invention is the provision of a novel arrangement of gearing which is operable to drive a number of cylindrical drums of equal diameters at different speeds, these drums being mounted adjacent to one another for rotation about a common axis and within a cylindrical member of sufficient length to embrace all of the drums, means being further provided for effecting a driving connection between any one of said drums and said cylindrical member depending upon the speed of rotation with which it is desired to drive said latter member.

Other objects, and objects relating to details of economy and operation will appear more fully hereinafter.

To enable those skilled in the art to comprehend and practice the invention, I have illustrated in the accompanying drawings and will now proceed to describe certain embodiments of the invention, it being understood that the invention is broadly adapted for use wherever it is desired to transmit power from a prime mover adapted to develop limited torque to a driven shaft. The invention consists substantially in the construction, combination, location and relative arrangement of parts, all as will be more fully hereinafter set forth, as shown in the accompanying drawings, and finally pointed out in the appended claims.

In the accompanying drawings:

Figure 4 is a top view of the mechanism, certain portions thereof being broken away and other portions being sectioned to more clearly show the relative arrangement of the several parts of the mechanism;

Figure 5 is an enlarged sectional view, showing the relative arrangement between one clutch drum unit and an adjacent internal and external gear unit;

Figure 6 is a perspective view showing the relation between one clutch drum unit, the clutch band therefor, the snubbing pin for said clutch band and the operating button for said snubbing pin;

Figure 7 is a partial transverse section through a portion of the mechanism;

Figure 8 is a partial horizontal section through a portion of the mechanism showing the relative arrangement of parts when the clutch band is snubbed about its respective clutch drum;

Figure 9 is a view similar to Figure 8 but showing the relative arrangement of parts when the clutch band is expanded and out of snubbing engagement with its clutch drum;

Figure 10 is a view similar to Figure 8, showing the relative arrangement of parts when the foremost clutch band is in snubbing engagement with its respective clutch drum;

Figure 11 is a view similar to Figure 9, showing the general arrangement of parts when the foremost clutch band is out of snubbing engagement with its respective clutch drum;

Figure 12 is a perspective view of the operating side of the mechanism, certain portions thereof being broken away and other portions thereof being sectioned to more clearly show the relative arrangement between certain of the parts of the mechanism;

Figure 1:
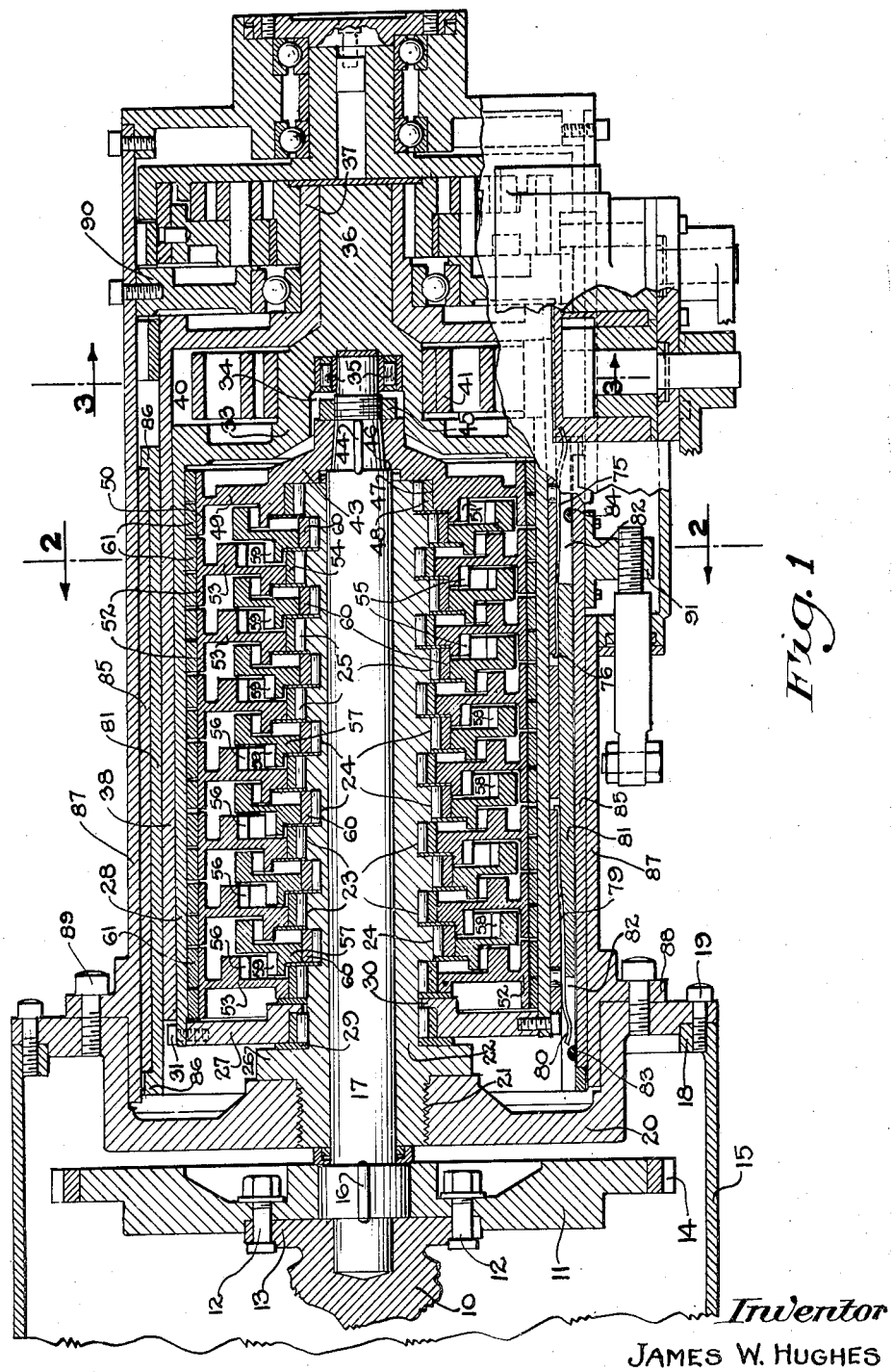
Figure 1 is a horizontal section through a power transmission mechanism embodying the principles of this invention.
Figure 2:
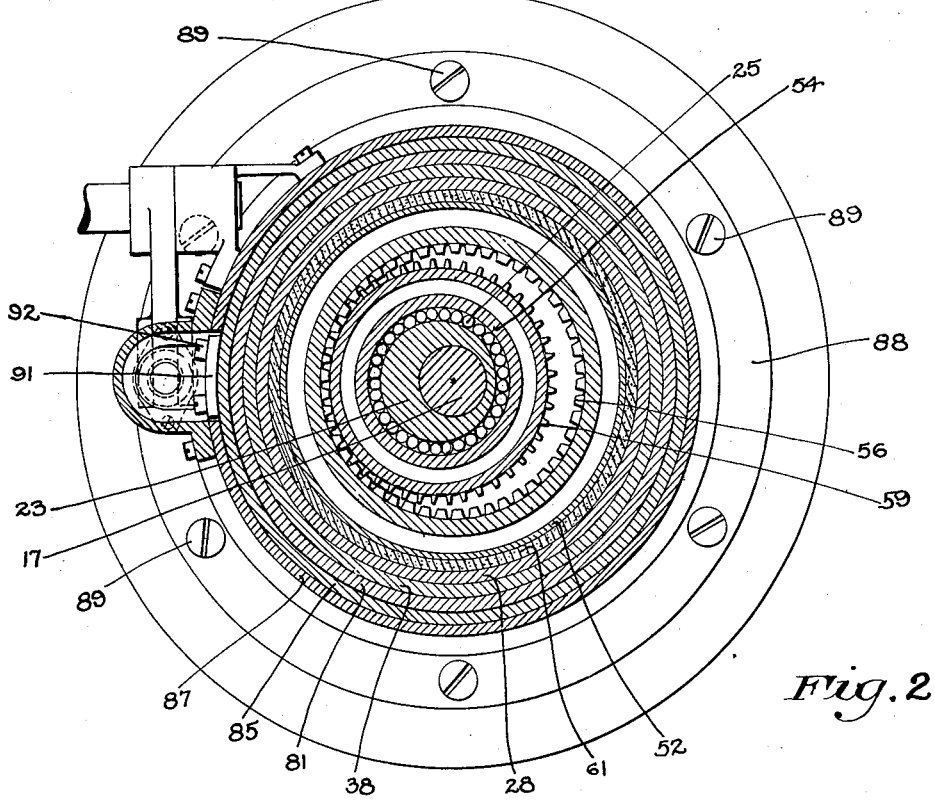
Figure 2 is a section taken on the line 2—2 of Fig. 1.

Figure 13 is a section taken on the line 13—13 of Figure 6, showing the manner of mounting the actuating-button springs in position upon the surface of the torque drum; and Figure 14 is a transverse section showing the direct driving clutch band as equipped with an auxiliary snubbing pin maintained under constant pressure by a fixed spring, this pin being operative, when the engine ceases to drive, to permit the vehicle to drive the engine.

Referring more particularly to the drawings it will be observed that the engine (not shown) is provided with the usual crank shaft 10 to which is secured the flywheel 11, this securement being preferably accomplished by means of the bolts 12 passing through the flywheel and through the annular flange 13 provided at the rear end of the engine crank shaft. The flywheel 11 is provided on its peripheral surface with the usual starting ring gear 14, the whole being enclosed within the flywheel housing 15. As the several parts to which reference has just been made are commonly found in one form or another in the art, further and more detailed description thereof is deemed unnecessary and superfluous.

Keyed to the central point of the flywheel 11, as at 16, and extending rearwardly therefrom is the primary driving shaft 17 this shaft being supported in axial alignment with the engine crank shaft in the manner to be described more fully hereinafter. The flywheel housing 15 is provided at its rear edge with an inturned flange 18 and secured to this flange by means of the bolts 19 is a sleeve ring 20 of the particular form shown in Figure 1. This ring 20 is provided with a central interiorly threaded opening 21, this opening being coaxial with but of greater diameter than the driving shaft 17. Threaded within this interiorly threaded opening 21 and encasing with suitable clearance the driving shaft 17 is a longitudinally extending roller bearing quill or sleeve 22, the external surface of which is provided with sets of roller bearing races 23 and 24, the races 23 being arranged concentrically with respect to the axis of the shaft 17 and the races 24 being arranged eccentrically with respect thereto.

In the particular instance shown in Figure 1, the bearing sleeve 22 is provided with eight such concentric bearing races, the eccentric races, totaling seven in number, being arranged one between each adjacent pair of concentric races. The forward bearing race 23, that is, the concentric race which is adjacent the threaded end of the bearing sleeve, is of a length sufficient to accommodate a pair of roller bearings for the purpose to be presently explained. The roller bearings operating in their respective concentrically and eccentrically arranged races are substantially alike and are designated by the reference numeral 25.

As appears most clearly in Figure 4, the roller bearing sleeve 22 is provided with an annular flange 26 which serves to limit the extent to which the sleeve may be threaded into its sleeve ring 20. Rotatably supported upon the set of roller bearings 25 which is located immediately to the rear of the annular flange 26 is a bearing member 27 for the forward end of the driving drum 28. A thrust washer 29 interposed between the bearing sleeve flange 26 and the bearing member 27 serves to prevent lateral displacement of the roller bearing 25 in one direction, while a flange 30 formed integrally on the bearing member 27 prevents lateral displacement of the bearing in the opposite direction. The forward end of the driving drum 28 is secured to the rotatably supported member 27 by the screws 31.

Provided at the rear end of the driving drum 28 and arranged for rotation therewith is the supporting member 33 for the rear end of the driving drum. As appears most clearly in Figure 1, this member 33 is provided with a central socket 34 within which is axially received the rearmost end of the driving shaft 17. Roller bearings 35 interposed between the driving shaft and the internal walls of the socket 34 permit free relative movement between the driving shaft 17 and the driving drum 28 at the same time that the member 33 constitutes an end bearing for the free end of the driving shaft. It will be noted that this driving drum end member 33 is provided with a rearward extension in the form of a stub shaft 36 upon which is rotatably mounted the member 37 constituting the rear end of the torque drum 38.

Figure 3:
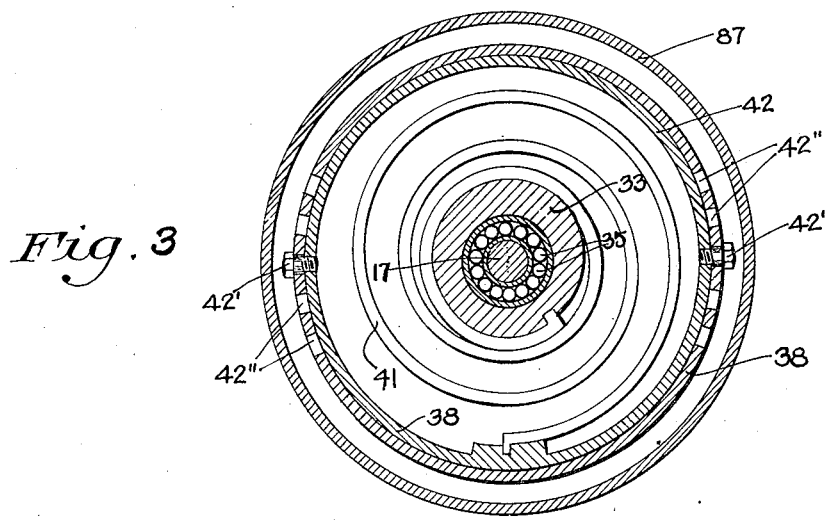
Figure 3 is a section taken on the line 3—3 of Fig. 1.

This torque drum 38 is arranged concentrically with respect to the axis of the driving shaft 17 and fits snugly upon but is free to rotate with respect to the driving drum 28. The end bearing member 37 for the torque drum is shown as being formed integrally with said drum, but for purposes of assembly and construction it may be desirable to construct it as a separate member and then key it to the torque drum. It will be observed that the rear end of the torque drum 38 terminates in a plane which is spaced rearwardly from the plane of the rear end of the driving drum 28 so that a space or chamber 40 is afforded between the respective end bearing members 33 and 37 of the driving and torque drums. Housed within this chamber 40 is a torque spring 41 in the form of a simple coil, the inner end of which is rigidly secured to the hub of the bearing member 33 while the outer end is secured to the internal surface of the rearwardly projecting portion of the torque drum 38. Preferably, the outer end of the torque spring 41 is secured to an annular slip ring 42 which is suitably secured, as by the screws 42′, within the projecting end of the torque drum 38. This slip ring is preferably arranged for angular adjustment with respect to the torque drum, and, as is most clearly shown in Figure 3, the latter is provided with several suitably spaced adjustment holes 42″ through any diametrically opposed pair of which the securing screws 42′ may pass for threaded engagement with the slip ring 42.

While it will be evident that upon rotation of the driving drum 28 the torque drum 38 will be rotated through the torque spring 41 operating as the driving connection between these drums, there still remains to be described the mechanism for imparting rotation to the driving drum upon rotation of the primary driving shaft. The description of this mechanism follows. As is shown most clearly in Figure 1, the driving shaft 17 is provided at its rear end with a driving flange 43, this flange being keyed to the shaft, as at 44, to prevent relative rotation therebetween. A drive shaft nut 45 is threaded upon the shaft 17 and prevents rearward longitudinal displacement of the flange 43 with respect to the shaft, while displacement in the opposite direction is prevented by the provision of an annular shoulder 46 against which the forward face of the driving flange abuts.

This driving flange 43 is of the particular form best shown in Figure 1 wherein it will be seen that the central portion thereof is provided with a forwardly presenting socket 47 which is coaxial with the driving shaft 17 when the driving flange is properly secured in position upon said shaft. Forced into the socket 47 and constituting the external race for the rearmost series of roller bearings 25 is a hardened steel ring member 48, the arrangement being such that upon rotation being imparted to the driving shaft, the driving flange 43 will be permitted to rotate freely about the rearmost concentrically arranged bearing race 23 on the bearing sleeve 22. If desired, the ring member 48 may be formed integrally with the driving flange 43, but it is preferable to construct it as a separate element arranged to be forced into the socket 47 of the driving flange 43. Extending outwardly from the socket 47 and in a direction normal to the longitudinal axis thereof is the web portion 49 of the driving flange. This web 49 is of course circular in form and is provided about its peripheral edge with an annular clutch drum 50. Preferably this latter drum is formed integrally with the driving flange, the web 49 being joined to the internal surface of the drum along the median line thereof. Provided upon the forward face of the web 49 of the driving flange and arranged concentrically with respect to the external bearing race 47 is an external ring gear 51, the side edge of which terminates just short of the plane of the forward edge of the clutch drum 50. It will be apparent that rotation of the driving shaft 17 will, by reason of its being keyed to the driving flange 43, cause the latter with its drum 50 and its external ring gear 51 to rotate about its respective bearing race 23.

Rotatably supported upon each of the remaining concentrically arranged bearing races 23 is a clutch drum 52, these latter drums being supported for rotation solely upon their respective bearing races 23 without any direct connection between them and the driving shaft 17 as is the case with the clutch drum 50. Similarly, as with the drum 50, the clutch drums 52 are respectively carried by the central webs 53, each of which latter is in turn provided with a central hardened steel ring 54 constituting the outer bearing race between which and the inner bearing race 23 are embraced the roller bearings 25. Also, as in the case of the driving flange 43, the webs 53 are provided upon their forward surfaces with external ring gears 55, these latter being in all respects identical with the external ring gear 51 of the driving flange 43. The foremost web 53, that is, the web of the drum 52 which is at the forward end of the mechanism, differs from the other webs 49 and 53 in that it is not provided with an external ring gear upon its forward surface. This last mentioned web is, however, provided upon its rear surface with an internal ring gear 56, the diameter of which is considerably greater than the diameter of the external gears 51 and 55. The side edge of the internal gear 56 terminates just short of the plane of the rearward edge of its respective clutch drum 52. As respects the provision of this internal ring gear 56 upon the rear surface of the foremost web 53, it will be observed that all of the webs 53 are similarly provided with such internal ring gears, the result being that, with the exception of the driving flange 43 and the foremost web 53, all of the intermediate webs 53 are each provided with an external ring gear 55 upon its forward surface and an internal ring gear 56 upon its rear surface. The driving flange 43 is provided only with an external ring gear while the foremost web 53 is provided only with an internal ring gear. In each instance, however, the gears, whether they be external or internal, are arranged to rotate concentrically with respect to the longitudinal axis of the driving shaft 17.

Arranged to rotate about each of the eccentrically located bearing races 24 and accordingly arranged to rotate eccentrically with respect to the axis of the driving shaft 17 is a combined internal and external ring gear unit 57, the internal ring gear 58 of which is adapted for entrainment with the external ring gear of the adjacent clutch drum unit, while the external ring gear 59 (see Fig. 5) thereof is adapted for entrainment with the internal ring gear of the opposite clutch drum unit. In a manner quite similar to that for rotatably supporting the clutch drum units the internal-external gear units 57 are provided with central hardened steel rings 60 which constitute the outer bearing races between which and the inner bearing races 24 are embraced the roller bearings 25. While the internal gear 58 is of greater diameter than the external gear 55 with which it is adapted to mesh, and while the external gear 59 is of smaller diameter than the internal gear 56 with which it is adapted to mesh, by reason of the fact that the clutch drum gears 55 and 56 are rotatable concentrically and the intermediate internal-external gear units 57 are rotatable eccentrically with respect to the longitudinal axis of the driving shaft 17, the entire series of gears are constantly in mesh, the gears 55 and 58 being entrained on one side of the shaft 17 while the gears 56 and 59 are entrained on the diametrically opposite side thereof. This appears most clearly in Figures 1 and 5.

It is well to note at this point that the clutch drums 50 and 52 are all of the same diameter and that they are all in axial alignment, thus providing, in effect, a continuous clutch drum surface extending practically the full distance between the front and rear bearing members 27 and 33, respectively, of the driving drum 28. It will be obvious that by securing the clutch drum 50 in any suitable manner against relative rotation with respect to the driving drum 28 and upon imparting rotation to the driving shaft 17 a direct connection will be provided between said driving shaft and the driving drum. Should, however, the clutch drum 52 which is next adjacent the drum 50 be secured against rotation with respect to the driving drum 28 a different speed ratio between the driving shaft and the driving drum will be obtained due to the fact that the driving flange 43 is in gear with that particular clutch drum which is held secured against rotation with respect to the driving drum. And in a similar manner a still different speed ratio may be obtained depending upon which one of the clutch drums 52 is being held against rotation with respect to the driving drum.

The mechanism for effecting this change in speed ratio automatically as the torsional resistance of the driven shaft is varied will now be described. Referring particularly to Figures 1 and 4, it will be seen that each of the series of clutch drums is provided with a clutch band 61, preferably in the form of a spiral, these bands being adapted, under certain conditions, to effect driving connections between their respective clutch drums and the driving drum 28. The clutch bands 61, which are preferably formed of spring metal, are interposed between the external surfaces of the clutch drums and the internal surface of the driving drum 28, the resiliency of the bands being such as normally to cause their being expanded against the driving drum and so permit the clutch drums each to rotate freely within its respective clutch band. One end of each of the clutch bands 61 is provided with a lug 62, which latter is in turn arranged to be received within a recess or socket 63 formed in the internal surface of the driving drum 28. The opposite and free end of each of the clutch bands 61 is provided with a tapered depression or aperture 64 (see Figure 7) and cooperating with these apertured ends of the clutch bands are a series of snubbing pins 65. These latter pins are movable radially through openings 66 provided in the driving drum 28, the inner ends of the pins being tapered, as at 67, to provide a wedging action upon the free ends of the clutch bands 61 when the pins are forced inwardly into respective engagement with the tapered depressions 64 in the clutch bands.

It will be observed that the clutch bands 61 are anchored to the internal surface of the driving drum 28 in such manner that their free and apertured ends are disposed in spaced circumferential relation with respect to the common external cylindrical surface of the clutch drums, that is, the free ends of the clutch bands are arranged in staggered relation within the driving drum 28. Necessarily, the snubbing pins 65 are also arranged in staggered relation, all of these pins being in substantial alignment or registry with their respective tapered apertures 64 of the clutch bands 61. It will thus be apparent that upon the provision of a suitable means for forcing any one of the snubbing pins 65 into wedging engagement with the free end of its respective clutch band 61, (the tapered end 67 of the pin being engageable for this purpose with the wall of the tapered aperture 64) a snubbing action of the clutch band about its respective clutch drum will be obtained when the said clutch drum is rotated. As a result of this snubbing action of the clutch band about its respective clutch drum the latter is enabled to impart a rotation to the driving drum 28 through the said clutch band.

Before proceeding with the description of the means for automatically causing any one of the pins 65 to be moved into wedging engagement with its respective depression in the free end of the particular clutch band which is to be snubbed or wound tightly about its respective clutch drum, it is believed that it will be of assistance in the understanding of the operation of this invention to describe briefly several of the trains of action as they may take place depending upon the torsional resistance which is to be overcome in the driven member.

It will be assumed for purposes of explanation that the mechanism (to be hereinafter described) for automatically clutching any one of the clutch drums to the driving drum 28 is operated to clutch the foremost drum 52 to said driving drum when the vehicle is initially started from rest. The driving train between this foremost drum 52 and the engine will be as follows: The driving shaft 17, driven by the engine crank shaft 10, will cause the driving flange 43 to be rotated thereby effecting rotation of the external ring gear 51 on said driving flange. This gear 51 is entrained with the internal ring gear 58 of the eccentrically rotatable unit 57 thereby causing the latter to be rotated. The external ring gear 59 of this unit 57 is in turn entrained with the internal ring gear 56 of the next adjacent clutch drum unit 53 and the external gear 55 of this latter unit is entrained with the internal gear 58 of the next adjacent eccentrically rotatable unit 57. This entrainment of the various gears, an internal gear of one unit with the external gear of the next adjacent unit and vice versa, is continuous throughout the entire series of the gears with the result that all of the clutch drums are caused to be rotated together but at different speeds. However, due to the fact that these clutch drums are freely rotatable within their respective clutch bands, unless any one of the latter be snubbed about its respective clutch drum, no rotative effort will be transmitted from the clutch drums to the driving drum 28. It has been assumed, however, that the foremost clutch band 61 has been snubbed about its clutch drum such that rotation of the latter will, through said tightly wound band 61, impart rotation to the driving drum 28. The driving connection between the intermediate series of entrained gears and the driving drum 28 is thus completed through this clutch band 61, and the driving drum 28, through its end member 33 and the torque spring 41, is thereby enabled to transmit its rotative movement to the driven member 37, which latter may be connected in any suitable manner to the driven shaft (not shown) of the vehicle. The train of action just traced is, of course, that which is capable of transmitting greatest power from the driving shaft to the driven member, this being necessary in view of the fact that the torsional resistance of the driven member is greatest at starting.

As the vehicle begins to speed up, however, less power need be transmitted from the driving shaft to the driven shaft due to the decrease in torsional resistance encountered by the latter. Accordingly, the train of action between the driving shaft 17 and the driving drum 28 will include only so many of the entrained gears as are actually necessary to effect rotation of the driven mechanism without causing the engine to be overloaded. It follows that when the torsional resistance of the driven member becomes a minimum, that is, when the vehicle has reached its normal operating speed, the train of action may be traced from the driving shaft 17 to the driving flange 43 and clutch drum 50, thence to the driving drum 28 through the action of the clutch band 61 which has been snubbed about said clutch drum 50, and thence from the driving drum 28 to the final driven member 37 through the torque spring 41.

It now remains to describe the mechanism for automatically changing the ratio of rotation between the prime driving member or shaft 17 and the final driven member 37 as the torsional resistance encountered by the latter is varied. This change in speed ratio is accomplished without effecting the disengagement of any of the driving gears, it being further understood that the clutch drums all operate in unison but at different speeds, the foremost of the clutch drums 52 revolving at slowest speed while the rearmost clutch drum 50 revolves at highest speed.

It will be recalled that the driving drum 28 is provided with a plurality of radially movable snubbing pins 65, (see Figs. 6, 7, 8 and 9) these pins being arranged for wedging action with the walls of the tapered depressions 64 in the free ends of the clutch bands 61 to thereby cause the latter to be snubbed about their respective clutch drums. As has been already stated these snubbing pins are arranged in staggered relation about the cylindrical surface of the driving drum, and depending upon which one of the pins is forced into engagement with its respective clutch band any one of the clutch drums may be clutched to the driving drum 28, for the purpose already explained. Normally, the several pins 65 are forced in outward direction by the tendency of the clutch bands to expand away from the external surfaces of their respective clutch drums, and in being so forced outwardly the outer ends of the pins are projected slightly beyond the outer cylindrical surface of the driving drum 28 (see Figures 7 and 9).

The torque drum 38, which is oscillatable about the driving drum 28 within certain limits permitted by the torque spring 41, is provided with a series of buttons 71 arranged in longitudinally and circumferentially spaced relation. Each of these buttons 71 is arranged to operatively engage the projecting end of one of the snubbing pins 65, the longitudinal spacing of these buttons being such that each lies in the transverse plane of its respective pin. However, the circumferential spacing of the buttons 71 is not similar to the spacing of the snubbing pins, the several buttons being so arranged that upon oscillation of the torque drum about the driving drum only one button at a time will be permitted to be in full operative engagement with its respective snubbing pin. However, the relative arrangement of buttons and pins is such that before any one button passes out of operative engagement with its respective snubbing pin the next adjacent button will already be passing into operative engagement with its respective pin. This is most clearly shown in Figure 4.

In the particular mechanism illustrated it will be observed that a total of eight clutch drums has been employed. This number may of course be reduced, thus reducing the number of entrained gears, as conditions warrant. In this particular instance, the snubbing pin actuating buttons 71 for the six intermediate clutch bands are identical and each of these buttons is resiliently urged inwardly toward the driving drum 28 by means of flat leaf springs 72, one end of each of the latter being secured, as at 73, to the torque drum 38, while the opposite end thereof is fixed, as at 74, to the outer end of its respective button 71. The arrangement of these intermediate buttons 71 with the springs 72 tending constantly to urge the buttons inwardly differs from the arrangement of the extreme forward and rear end buttons 71.

In the case of the rear end button a leaf spring 75 is employed, one end of which is fixed, as at 76, to the torque drum. This spring 75 has a normal tendency to flex outwardly and away from the external surface of the torque drum and in doing so maintains its button 71 in outwardly retracted position, this button being secured to the spring at a point intermediate the ends thereof, as at 77. The freely extending end of the spring 75 is bowed outwardly, as at 78, for a purpose to be presently explained. The forward end button 71 is secured in position in much the same manner as is the rear end button, a spring 79 being employed for this purpose which is in all respects similar to the spring 75. However, the spring 79 is in reverse position as respects the spring 75, the outwardly bowed free end 80 thereof extending forwardly as distinguished from the rearwardly extending free end 78 of the spring 75.

Surrounding the torque drum 38 is an operating drum 81, this latter drum being keyed to the torque drum in such manner as to prevent relative rotation without, however, preventing relative longitudinal movement therebetween. In other words, while the operating drum 81 is rotatable with the torque drum 38, it may be shifted longitudinally with respect thereto. The springs 77 and 79 operating respectively upon the extreme rear and forward end snubbing pin actuating buttons 71 are accommodated in suitable longitudinally extending notches or slots 82 provided for the purpose upon the internal surface of the operating drum 81. Also provided upon said internal surface of the operating drum are a pair of longitudinally spaced cams 83 and 84, the cam 83 being adapted to ride over the bowed end 80 of the spring 79 and the cam 84 being similarly adapted to ride over the bowed end 78 of the spring 75 when the operating drum 81 is shifted longitudinally with respect to the torque drum 38. This shifting movement of the operating drum is accomplished by means of a shifting drum 85, the opposite ends of which operate upon annular flange members 86 secured in any suitable manner to the ends of the operating drum 81. While these flanges serve effectually to prevent any relative longitudinal shifting between the operating and shifting drums, they do not in any manner prevent their relative rotation, this latter being of course necessary in the operation of the mechanism.

Enclosing the shifting drum 85 is the main outside casing 87, the forward end of which is secured in any suitable manner to the front sleeve ring 20. Preferably, a flange 88 provided upon the casing 87 is secured to this sleeve ring by means of the screws 89. The rear end of the casing 87 is enclosed by an end wall 90 constituting a bearing member for the final driven member 37 of the transmission mechanism. Projecting through the side wall of the casing 87 is the operating member 91 for the shifting drum 85, this member 91 being fastened to said drum in any suitable manner, preferably by the screws 92, and being in turn operatively connected to any manual control, such as an ordinary foot or hand-operated lever (not shown).

Referring more particularly to Figure 1 it will be noted that the distance between the cam 83 and the crown of the bowed end 80 of the spring 79 is one-half the distance between the cam 84 and the crown of the bowed end 78 of the spring 75. It will thus be apparent that when the shifting drum 85 is initially operated, that is, shifted rearwardly, the cam 83 will be the first of the two cams to engage its respective spring with the immediate result that the forward end button 71 will be pressed inwardly into engagement with its respective snubbing pin 65 so that the latter will in turn be forced into wedging engagement with the tapered depression in the free end of the foremost clutch band 61. This band 61 will thereby be caused to wind tightly about its respective clutch drum 52 (a snubbing action being had) whereupon a driving connection will be provided between said clutch drum and the driving drum 28. The resulting train of action between the prime driving member and the final rotating driven member will be exactly similar to that which has been already traced.

The operation of the mechanism should now be readily understood from the foregoing description thereof. When the engine is initially started and it is desired to propel the vehicle forwardly from the rest position, it is merely necessary to actuate the control lever (not shown) in such manner as to shift the shifting drum 85 rearwardly. This immediately results in the cam 83 riding over the bowed end of the spring 79, thereby causing the foremost actuating button 71 to be moved inwardly into operative engagement with its respective snubbing pin 65. This latter pin is thus forced into wedging engagement with the free end of its respective clutch band 61, to thereby cause the latter to become snubbed about its respective clutch drum 52. (This latter clutch drum is, of course, the foremost one of the series.) Due to the fact that the opposite end of this band is anchored to the driving drum 28 a positive connection is obtained between this driving drum and the snubbed clutch drum 52. The latter, being connected through the entire series of entrained internal and external gears, is thus driven by the primary driving shaft 17, and in turn causes the driving drum 28 to be driven at a speed equal to the speed of said snubbed clutch drum. Through the torque spring 41 the driving drum 28 effects rotation of the final driven member 37 of the transmission mechanism, this latter being in turn connected to the driven shaft (not shown) of the vehicle.

The initial torsional resistance of the driven shaft being thus overcome to a certain extent the vehicle begins to move forwardly at slow speed. The control lever (not shown) is then immediately actuated further to shift the shifting drum still further rearwardly with the result that the second cam 84 rides over the bowed end of the spring 75, thereby causing the rearmost actuating button 71 to be moved inwardly into operative engagement with its respective snubbing pin 65. This latter pin is thus forced into wedging engagement with the free end of its respective clutch band 61, in this case the rearmost band, to thereby cause the latter to become snubbed about its respective clutch drum 50. This snubbed drum 50, being keyed directly to the driving shaft 17, serves as the driving connection between the driving shaft and the driving drum 28, and the latter, through the torque spring 41, continues to drive the final driven member 37 of the transmission mechanism. However, due to the fact that the rearmost drum 50 is being driven at a much higher speed than the foremost drum 52, the relative speed of rotation between the members 33 and 37 is greater than when the latter was initially rotated through the foremost clutch drum 52, the result being that the final driven member 37 will, due to the torsional resistance encountered thereby, be caused to lag behind the driving drum member 33, thereby causing the torque drum 38 to similarly lag behind the driving drum 28.

As a natural consequence of this change in angular relation between the driving drum 28 and the torque drum 38, the latter will, through the series of spring pressed actuating buttons 71 carried thereby, cause the several clutch bands 61 to be successively snubbed about their respective clutch drums 52 to thereby cause the latter to be seriately clutched to the driving drum 28. It will be understood that the several clutching actions will take place beginning from the rearmost clutch drum 50 successively through the several clutch drums until the foremost clutch drum of the series has been clutched to the driving drum. Due to the fact that in this order of operation the clutch drums are driven at gradually decreasing speeds it will be apparent that the speed of rotation of torque drum 38 will eventually equal that of the driving drum 28. During the time that the angular relation between the drums 28 and 38 has been changing it will, of course, be evident that the torque spring 41 has been gradually coiling up, further coiling up of this spring being immediately arrested when the speeds of rotation of the drums 28 and 38 become equal.

At this point it will be observed that the vehicle will be traveling in one of the lower gears. The normal tendency of the torque spring 41 being constantly to uncoil, as soon as the speeds of rotation of the drums 28 and 38 become the same and the torsional resistance of the driven member 37 is overcome, the torque spring will begin to uncoil with the result that the drum 38 will again be caused to lag behind the drum 28 at a gradually increasing rate. A reverse action from that just described will then take place, the several clutch drums 52 being successively clutched to the driving drum 28 in a rearward direction until the rearmost clutch drum 50 becomes clutched to the driving drum. It will, of course, be understood that these successive clutching actions are effected by the operative engagement of the several actuating buttons 71 with their respective snubbing pins 65, the rearmost of these buttons being maintained in operative engagement with the rearmost snubbing pin as long as the shifting drum 85 is held in its final rearwardly shifted position. In this position of the shifting drum the cam 84 carried thereby will be in engagement with the bowed end of the spring 75, thereby effecting the necessary depression of the snubbing pin 65 into wedging engagement with the final rearmost clutch band 61.

It will, of course, be understood that not all of the clutch drums 52 need be clutched to the driving drum 28. The number of such clutch drums which are successively clutched to this drum depends altogether upon the torsional resistance encountered by the final driven member 37 and, therefore, upon the extent to which the torque spring 41 is coiled up. Obviously, should the torsional resistance to be overcome be small the torque spring will be coiled up only a certain extent, thus effecting a successive snubbing action of only a certain number of the clutch bands 61 about their respective clutch drums, this snubbing action beginning with the rearmost clutch band of the series.

Figure 14 shows an arrangement which is operative to automatically cause the vehicle, when the engine ceases to drive, to drive the engine. The direct driving clutch band 61, which is that band surrounding the rearmost clutch drum 50, is provided, in addition to the pin 65, with an auxiliary snubbing pin 93 located at the opposite end of the band and arranged to be constantly urged toward said band by means of a fixed spring 94 secured to the driving drum 28 in any suitable manner. The inner end of this pin 93 is tapered, as at 95, (exactly as are the pins 65) to provide a wedging action upon that end of the band which is provided with the lug 62, the band being provided at this end with a tapered depression 96 for the purpose, the result being that said end of the band is forced inwardly against the surface of the clutch drum 50. The opposite end of the band is provided with a lug 97 arranged to seat in the recess or socket 98 in the driving drum 28, the arrangement being such that when the pin 93 is urged inwardly toward its tapered depression 96 (the tapered end of the pin being engageable with the wall of the tapered depression) a snubbing action will be had upon the clutch drum 50 with the result that the member 33 will begin to drive this clutch drum through the lug 97.

The action just described takes place, of course, only when the engine has ceased to drive and when the momentum of the vehicle is sufficient to drive the engine, as when the vehicle is coasting. It will be understood that when the engine is operating normally to transmit power, its direction of rotation being that indicated by the arrow in Figure 14, the auxiliary snubbing pin 93 has no effect upon the direct driving clutch band, the snubbing pin 65 being then solely operable to cause the snubbing action of said band about the clutch drums 50 in the manner heretofore described. However, when the engine ceases to transmit power but the vehicle continues to travel under its own momentum, as when coasting, the auxiliary snubbing pin 93 becomes operative to cause the member 33 to drive the engine through the intervention of the lug 97, the snubbing band 61 and the clutch drum 50, the action being then the same as though the engine were being driven backwards.

The many advantages of the herein described transmission mechanisms will be apparent to those skilled in the art. Not only has the usual clutch and gear-shifting speed-change box been eliminated, but the necessity for the usual service or emergency brakes has also been obviated, it being apparent that the engine is itself capable of acting as a brake to reduce the speed of the vehicle. The speed of the vehicle is controlled entirely by the control lever operatively connected to the shifting drum, it being possible, by means of this lever, to cause the shifting drum to be shifted forwardly and so, automatically and without any perceptible jar in the system of gears, to effect a low gear connection between the prime driving member and the final driven member. Also, instead of simply three or four definite speed gear ratios, as is ordinarily the case, there has been provided a greater available number of such ratios, the change from one to another being accomplished automatically and in exact accordance with the torsional resistance which may be encountered by the final driven member due to its connected load.

It is to be understood, of course, that various changes in the construction and relative arrangement of the several parts herein disclosed and described, may be made from time to time without departing from the real spirit or principles of this invention, and it is accordingly intended to claim the same broadly, as well as specifically, as indicated in the appended claims.

What is claimed as new and useful is:

1. In a mechanical power transmission mechanism, in combination, a primary driving member, a final variable speed driven member, a series of permanently entrained gears for interconnecting said driving and driven members and arranged in embracing relation with respect to the common axis of said members, a fixed bearing about which all of said gears rotate, and means embracing said gears for varying the speed ratio between said driving and driven members without disturbing the permanent entrainment between said gears.

2. In a mechanical power transmission mechanism, in combination, a prime rotating driving member, a final rotating variable speed driven member, a system of permanently meshed gearing arranged to interconnect said driving and driven members, all of said gearing being arranged in embracing relation with respect to said members, a fixed bearing about which all of said gearing rotates, and means embracing said gearing for changing the speed ratio between said driving and driven members without effecting disentrainment of any of said meshed gearing.

3. In a mechanical power transmission mechanism, in combination, a prime driving rotating member, a final driven rotating member, said driven member being in axial alignment with said driving member, a series of permanently entrained gears driven by said prime driven member and arranged to drive said final driven member, all of said gears being arranged in embracing relation with respect to the common axis of said members for rotation about fixed axes, and means for changing the speed ratio between said driving and driven members automatically as the torsional resistance encountered by said driven member is varied.

4. In a mechanical power transmission mechanism, in combination, a prime rotating driving member, a series of permanently entrained gears rotatable about fixed axes and arranged to be driven by said driving member, a final rotating driven member in axial alignment with said driving member and arranged to be driven by said series of gears, all of said gears being arranged in embracing relation with respect to the common axis of said members, and means embracing said gears for changing the speed ratio between said driving and driven members while said series of gears are maintained in positive permanent entrainment.

5. In a mechanical power transmission mechanism, in combination, a prime rotating driving member, a series of rotating members all rotatable about the axis of said driving member and arranged to be driven simultaneously but at different speeds by said driving member, a final rotating driven member with respect to which said series of members are freely rotatable, and means arranged in embracing relation with respect to said rotating members for connecting said driven member to any one of said series of rotating members.

6. In a mechanical power transmission mechanism, in combination, a prime rotating driving member, a final rotating driven member, a series of intermediate members rotatable independently of said driven member and arranged to be driven by said driving member simultaneously but at different speeds, a fixed bearing member about which all of said intermediate members rotate, and means embracing said intermediate rotating members for connecting said final driven member to any one of said intermediate members whereby to effect its rotation in unison with that particular intermediate member to which it is connected.

7. In a mechanical power transmission mechanism, in combination, a prime rotating driving member, a series of permanently entrained gears driven at different speeds by said driving member, all of said entrained gears being arranged in encircling relation with respect to said driving member, a fixed bearing element upon which all of said gears rotate, an intermediate rotating member driven in unison with certain of said gears, a final rotating driven member, and means embracing said gears for connecting said final rotating driven member to any particular one of said intermediate rotating members whereby to cause said final driven member to be rotated at a speed equal to the speed of rotation of said particular intermediate rotating member.

8. In a mechanical power transmission mechanism, in combination, a prime rotating driving member, a series of intermediate rotating members, a fixed bearing member about which all of said intermediate members rotate, means embraced by said series of members and arranged to drive each of the latter at a different speed, a final rotating driven member, and means embracing all of said intermediate members for directly connecting any one thereof to said final driven member.

9. In a mechanical power transmission mechanism, in combination, a prime rotating driving member, a series of intermediate rotatable members, a fixed bearing member upon which all of said intermediate members rotate, means surrounded by said intermediate members and arranged for simultaneously and continuously rotating said intermediate members at respectively different speeds, a final rotating driven member, and means embracing all of said intermediate members, for causing said driven member to revolve directly and in unison with any one of said intermediate rotating members.

10. In a mechanical power transmission mechanism, in combination, a prime rotating driving member, a series of intermediate rotating members rotatable about a common fixed axis, a final rotating driven member operatively associable with all of said intermediate rotating members, means also rotatable about a common fixed axis for causing said intermediate members to be rotated at respectively different speeds, and a plurality of snubbing bands interposed between said intermediate members and said driven member for selectively connecting any one of said intermediate members directly to said driven member.

11. In a mechanical power transmission mechanism, in combination, a prime rotating driving member, a series of permanently entrained gears rotatable about a fixed bearing element, a final rotating driven member operatively associable with all and arranged to be connected to certain of said gears, and a plurality of snubbing bands interposed between said gears and said driven member, said bands being respectively operable to change the connecton of said driven member from any certain series of said series of gears to another one thereof.

12. In a mechanical power transmission mechanism, in combination, a prime rotating driving member, a series of intermediate rotating members embracing said driving member, a single fixed bearing member about which all of said rotating members are rotatable, a final rotating driven member operatively associable with all of said intermediate members and arranged to be directly connected to any one of said series at any one time, and means embracing all of said members for automatically changing the connection of said driven member from any one of said series of intermediate rotating members to another one thereof.

13. In a mechanical power transmission mechanism, in combination, a rotating driving member, a final rotating driven member, a series of intermediate rotating members rotatable in unison independently of said driven member, said series of members being independently operative for connecting said driving member to said driven member, a single fixed bearing about which all of said intermediate members are rotatable, means for rotating said series of intermediate members about said bearing at respectively different speeds, and means embracing said rotatable members for automatically changing the connection of the final driven member from one intermediate rotating member to another in accordance with the torsional resistance encountered by said final driven member.

14. In a mechanical power transmission mechanism, in combination, a rotating driving member, a series of rotating members arranged to be simultaneously driven by said driving member, a driving drum operatively associable with all of said rotating members, means for connecting any one of said rotating members to said driving drum, a final rotating driven member, a torque spring interconnecting said driving drum and said final driven member, and means operative through the angular deflection of said torque spring to change the connection of said driving drum from one of said series of rotating members to another thereof.

15. In a mechanical power transmission mechanism, in combination, a prime rotating driving member, a series of rotating members arranged to be driven by said driving member at respectively different speeds, a fixed bearing member upon which said series of members is rotatable, a final rotating driven member, means arranged in embracing relation with respect to said series of members for connecting said driven member to one of the rotating members, means for permitting a limited angular displacement of said driven member with respect to said rotating members, and means for changing the connection of said driven member from one of said rotating members to another in accordance with the extent of said angular displacement.

16. In a mechanical power transmission mechanism, in combination, a prime rotating driving member, a series of rotating members concentrically disposed with respect to said driving member and arranged to be driven at different speeds thereby, a clutch band surrounding each of said rotating members, said band being normally arranged to permit its respective rotating member to rotate freely therewithin, independent means for causing one of said bands to be snubbed about its respective rotating member, and means commonly embracing said independent means for automatically causing said bands to be successively snubbed about their respective rotating members in a definite sequence.

17. In a mechanical power transmission mechanism, in combination, a prime rotating driving member, a series of rotating members concentrically disposed with respect to said driving member and arranged to be driven at different speeds thereby, a clutch band embracing each of said rotating members, said band being normally arranged to permit its respective rotating member to rotate freely therewithin at its particular speed, means commonly embracing all of said bands for automatically causing said bands to be successively snubbed about their respective rotating members in a definite sequence, and means for releasing any one band only after the next adjacent band has been snubbed about its respective rotating member.

18. A mechanical power transmission mechanism for transmitting power from a driving shaft to a driven member, said shaft and member being in axial alignment, including a series of adjacent clutch elements concentrically arranged with respect to the common axis of said shaft and member and arranged to be driven by said driving shaft, means eccentrically arranged with respect to said axis for rotating said clutch elements at respectively different speeds, and means embracing said clutch elements and operatively associable with said driven member for causing the latter to be engaged with and revolved by any one of said series of clutch elements.

19. A mechanical power transmission mechanism for transmitting power from a driving shaft to a driven shaft, said shafts being in axial alignment, including a series of adjacent clutch elements arranged to be driven at respectively different speeds by said driving shaft, said clutch elements being revoluble about a single fixed bearing member, and means commonly embracing said entire series of clutch elements and operatively associable with said driven member for successively connecting the latter to each of said series of clutch elements.

20. In a mechanical power transmission mechanism, in combination, a prime rotating driving member, a series of rotating members concentrically arranged with respect to and arranged to be driven by said driving member at different speeds, a fixed bearing upon which said series of members is rotatable, a final driven rotating member coaxially aligned with respect to said driving member and arranged to be variably connected to any one of said series of rotating members, said variable connection consisting of a torque spring, independent means embracing each of said rotating members for individually connecting said final driven member to each of said series of rotating members, and means commonly embracing all of said last mentioned means for changing said connection successively from one to another of said rotating members in accordance with the resistance encountered as said torque spring is angularly deflected.

21. In a mechanical power transmission mechanism, in combination, a prime rotating driving member, a rotating driven member arranged to be driven by said driving member, a series of entrained internal-external gears seriately arranged intermediate said driving and driven members, clutching devices each operatively associable with a certain one of said gears, and means operative to effect engagement of said rotating driven member with any of said clutching devices.

22. A power transmission mechanism comprising a driving member, a final driven member, a series of entrained gears permanently connected to the driving member for connecting the latter to said driven member, all of said gears being independently mounted for rotation upon a single bearing member, and means arranged in embracing relation with respect to said gears for connecting certain of said gears to said driven member.

In testimony whereof, I have hereunto affixed my signature.

JAMES W. HUGHES.